United States Patent
Lee

[11] Patent Number: 6,011,603
[45] Date of Patent: Jan. 4, 2000

[54] DOUBLE SUPER TWISTED NEMATIC LIQUID CRYSTAL DISPLAY WITH IMPROVED PRE-TILT ANGLES

[75] Inventor: Sung-ki Lee, Pusan, Rep. of Korea

[73] Assignee: Samsung Display Devices Co., Ltd., Kyungki-do, Rep. of Korea

[21] Appl. No.: 08/971,358

[22] Filed: Nov. 17, 1997

[30] Foreign Application Priority Data

Nov. 20, 1996 [KR] Rep. of Korea ................ 96-55848

[51] Int. Cl.[7] .................................................. G02F 1/1347
[52] U.S. Cl. ........................................................... 349/75
[58] Field of Search ......................................... 349/75, 76

[56] References Cited

U.S. PATENT DOCUMENTS 5,126,868   6/1992   Kizaki et al. ........................... 349/76

FOREIGN PATENT DOCUMENTS 3-89322   4/1991   Japan ...................................... 349/76

Primary Examiner—James A. Dudek
Attorney, Agent, or Firm—Lowe Hauptman Gopstein Gilman & Berner

[57] ABSTRACT

A double super twisted nematic (DSTN) liquid crystal display (LCD) is provided. The DSTN LCD includes: a liquid crystal display cell having first and second transparent substrates arranged parallel to each other, first and second orientation layers formed on opposing surfaces of the first and second transparent substrates, respectively, a liquid crystal sealed between the first and second transparent substrates, and indium tin oxide (ITO) electrodes formed on the opposing surfaces of the first and second transparent substrates while crossing each other; and a liquid crystal compensation cell having a third transparent substrate attached on the second transparent substrate, a fourth transparent substrate arranged in parallel to the third transparent substrate, third and fourth orientation layers formed on each opposing surface of the third and fourth orientation layers, and a liquid crystal sealed between the third and fourth orientation layers, wherein the pre-tilted angle of the liquid crystal sealed between the first and second orientation layers differs from the pre-tilted angle of the liquid crystal sealed between the third and fourth orientation layers such that the difference between changes in the refractive index anisotropies of the liquid crystals is compensated for.

6 Claims, 1 Drawing Sheet

DOUBLE SUPER TWISTED NEMATIC LIQUID CRYSTAL DISPLAY WITH IMPROVED PRE-TILT ANGLES

BACKGROUND OF THE INVENTION

1. Field of the Invention

The present invention relates to a double super twisted nematic (DSTN) liquid crystal display (LCD), and more particularly, to a DSTN LCD capable of compensating for variations in the refractive index anisotropy of liquid crystals contained in two liquid crystal cells, caused by a difference in temperature, by controlling a pre-tilt angle with orientation layers.

2. Description of the Related Art

A twisted nematic (TN) liquid crystal cell having liquid crystal molecules twisted at 90° angles, is widely used in small displays, such as a wrist watch or a small measuring device, due to its low voltage, low power consumption, and long life span. On the other hand, a liquid crystal cell having a narrow range of a threshold voltage and a large twisted angle is required for increasing display area and picture of quality. In a super twisted nematic (STN) liquid crystal, the twisted angle of the liquid crystals is large, somewhere in the range of 180°~270°, the image is displayed in yellow, green or blue, instead of black and white, according to the application an electric field. As shown in FIG. 1, a DSTN LCD adopts a liquid crystal compensation cell 20 connected to a liquid crystal display cell 10, in order to achieve optical compensation, such that an image is displayed in black and white by removing the tinted color. Polarization plates 11 and 21 are attached to exterior sides of the liquid crystal display cell 10 and the liquid crystal compensation cell 20.

The general requirement for the liquid crystal compensation cell is as follows.

The twisted angle $-\phi$ of liquid crystals of a second liquid crystal layer 22 of the liquid crystal compensation cell 20 is the same as the twisted angle $\phi$ of liquid crystals injected into a first liquid crystal layer 12 of the liquid crystal display cell 10, except for its direction which is opposite to the twisted angle $\phi$. Also, assuming that the refractive index anisotropy of the liquid crystals contained in the respective liquid crystal layers 12 and 22 is $\Delta n$ and the cell gaps are D1 and D2, respectively, the following relationship must be satisfied.

$$\Delta n \cdot D1 = \Delta n \cdot D2 \quad (1)$$

Here, the refractive index anisotropy represents the difference between an extraordinary refractive index and a normal refractive index.

Also, orientation layers 13, 14, 23 and 24 are processed by rubbing, such that the orientation of liquid crystals are perpendicular to each other at a contact portion between the liquid crystal display cell 10 and the liquid crystal compensation cell 20.

If the above conditions are satisfied, a linear polarized light emitted from a light source (not shown) via the polarization plate 11 is changed into an elliptical polarized light while passing through the liquid crystal display cell 10, due to a birefringent effect of the liquid crystals. However, the elliptical polarized light is changed back into the original linear polarized light while passing through the liquid crystal compensation cell 20, thereby eliminating the tinted color. Thus, a black and white display color is obtained.

In general, the refractive index anisotropies of the liquid crystals in the first and the second liquid crystal layers 12 and 22 vary with temperature. In the case of a backlight-type display, the temperature of liquid crystal of the first liquid crystal layer 12, which is near the backlight (not shown), is higher than that of the second liquid crystal layer 22 during operation. Accordingly, the amount of change in the refractive index anisotropy of the first liquid crystal is different from that of the second liquid crystal, thereby making the predetermined setting of the directions between the first and second liquid crystals, as aforementioned, ineffective.

Thus, the equation (1) is satisfied in the prior art by differing the cell gaps D1 and D2, and the type of liquid crystals implanted into the liquid crystal layers 12 and 22. Here, if the values of $\Delta n \cdot D1$ and $\Delta n \cdot D2$ are out of a predetermined range, leakage of light in a non-selected state, where electricity is not applied, is increased, sharply lowering contrast. Thus, in general, the cell gaps D1 and D2 are precisely controlled within a range of ±0.05 μm.

However, in order to differ the cell gaps D1 and D2, spacers having different sizes are necessary in the manufacturing process. Also, when injecting liquid crystals, the injection pressure must be considered, and sealing after injection of liquid crystals is also complicated. In addition, the types of liquid crystals that have been developed up until now are not sufficient for compensating for the change in the refractive index anisotropy.

SUMMARY OF THE INVENTION

To solve the above problems, it is an object of the present invention to provide a double super twisted nematic (DSTN) liquid crystal display (LCD) capable of compensating for an optical phase difference according to a change in the refractive index anisotropy of liquid crystals caused by a difference in temperature, and capable of being easily manufactured.

To achieve the object, there is provided a double super twisted nematic (DSTN) liquid crystal display (LCD) comprising: a liquid crystal display cell having first and second transparent substrates arranged parallel to each other, first and second orientation layers formed on opposing surfaces of the first and second transparent substrates, respectively, a liquid crystal sealed between the first and second transparent substrates, and indium tin oxide (ITO) electrodes formed on the opposing surfaces of the first and second transparent substrates while crossing each other; and a liquid crystal compensation cell having a third transparent substrate attached on the second transparent substrate, a fourth transparent substrate arranged in parallel to the third transparent substrate, third and fourth orientation layers formed on each opposing surface of the third and fourth orientation layers, and a liquid crystal sealed between the third and fourth orientation layers, wherein the pre-tilted angle of the liquid crystal sealed between the first and second orientation layers differs from the pre-tilted angle of the liquid crystal sealed between the third and fourth orientation layers such that the difference between changes in the refractive index anisotropies of the liquid crystals is compensated for.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Figure 1:
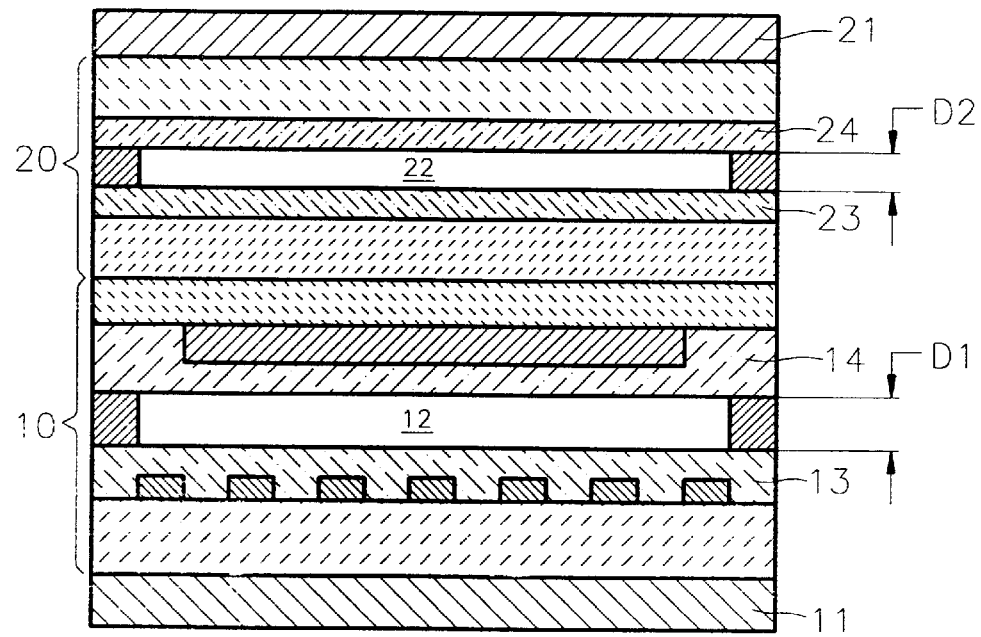
FIG. 1 is a vertical section view of a conventional double super twisted nematic (DSTN) liquid crystal display (LCD)
Figure 2:
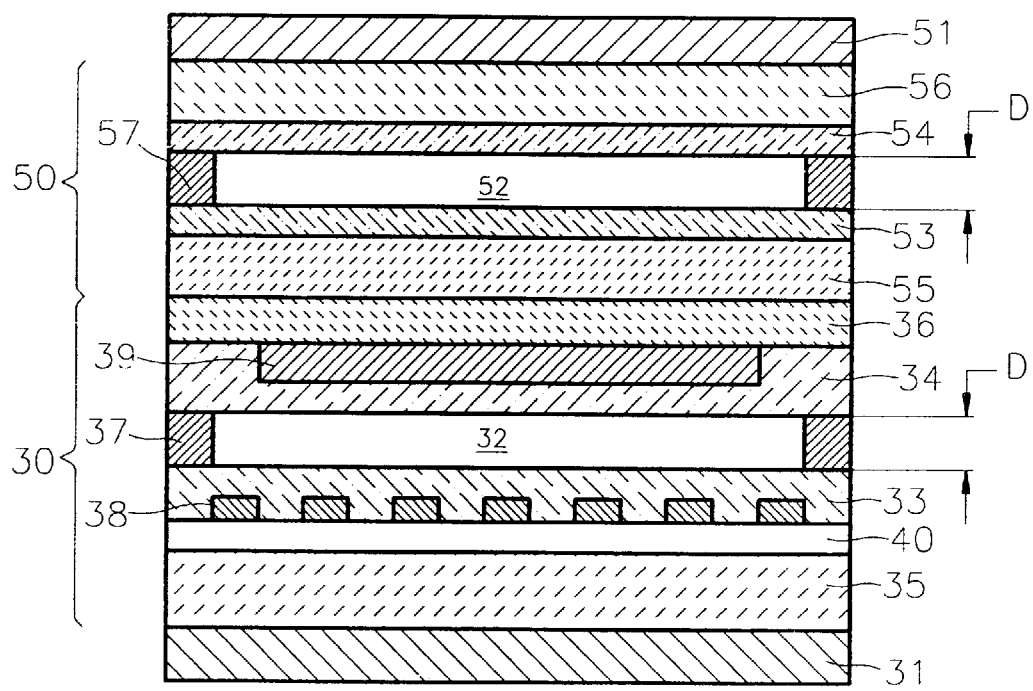
FIG. 2 is a vertical section view of a DSTN LCD according to the present invention.

Referring to FIG. 2, the LCD of the present invention includes a liquid crystal display cell 30 and a liquid crystal compensation cell 50 which are attached parallel to each other. Polarization plates 31 and 51 are attached to exterior sides of the liquid crystal compensation cell 50 and the liquid crystal display cell 30, respectively, and a light source (not shown) is placed beneath the polarization plate 31.

The liquid crystal display cell 30 and the liquid crystal compensation cell 50 include a pair of transparent substrates 35 and 36, and 55 and 56, such as glass, respectively, wherein each pair of transparent substrates has a predetermined gap D. Between each pair of transparent substrates, the same type of nematic liquid crystals are sealed by sealant 37 and 57 made of frit glass or organic adhesive agent. Here, each cell gap D in the liquid crystal display cell 30 and the liquid crystal compensation cell 50 is the same as all the rest, approximately 5~15 μm.

Also, orientation layers 33 and 34, and 53 and 54 for aligning liquid crystals in a predetermined direction are formed in the opposing surfaces of each transparent substrate. The rubbing direction of the orientation layer 33 is at a predetermined angle with respect to the rubbing direction of the orientation layer 34, according to the characteristics of the liquid crystals such that maximum light transmittance is obtained. The orientation layers 53 and 54 are rubbed in the same manner as the orientation layers 33 and 34. Also, a first indium tin oxide (ITO) electrode 38 and a second ITO electrode 39, having a predetermined pattern, are formed on the opposing surface of the transparent substrates 35 and 36, crossing each other. Also, a color filter layer 40 is formed between the transparent substrate 35 and the first ITO electrode 38.

According to the present invention, the difference of changes in the refractive index anisotropies (Δn) between the liquid crystals of the liquid crystal layers 32 and 52, caused by a change in temperature or peripheral circumstance, can be compensated for by controlling pre-tilt angles of each liquid crystal. Preferably, the pre-tilt angle of the liquid crystal arranged by the orientation layers 53 and 54 of the liquid crystal compensation cell 50 is 3–4° smaller than that of the liquid crystal arranged by the orientation layers 33 and 34 of the liquid crystal display cell 30. Here, the "pre-tilt angle" in the specification and claims means a slant angle of the liquid crystal with respect to the transparent substrate.

The pre-tilt angle of the liquid crystals is controlled to a desired value according to the material of the orientation layers 33 and 34, and 53 and 54, and the processing method on the orientation layers. That is, the orientation layers 33 and 34 of the liquid crystal display cell 30 and the orientation layers 53 and 54 of the liquid crystal compensation cell 50 are formed of different materials, so that an approximate pre-tilt angle required for compensating for the difference of the changes in the refractive index anisotropies is obtained. Then, conditions of rubbing on the orientation layers 33 and 34, and 53 and 54, including rubbing direction, rubbing pressure and rubbing temperature, are controlled to obtain the intended pre-tilt angle. Polyamide materials, which have been widely used for orientation layers 33 and 34, and 53 and 54, provide a comparatively wide range of pre-tilt angles according to curing temperature and rubbing pressure. Also, the orientation layer may be treated to have a desired direction by a slant deposition method in which a slant angle of a beam emitted thereon is controlled.

Preferably, the orientation layer 53 is rubbed such that the rubbing direction of the orientation layer 53 is perpendicular to that of the orientation layer 34, and the rubbing direction of the orientation layer 54 forms a 45° angle with that of the orientation layer 53.

In the operation of the LCD according to the present invention, the difference of the change in the refractive index anisotropy of the liquid crystal of the liquid crystal layer 32 according to a change in temperature, caused by a difference in the amount of light irradiated from the light source, is compensated for by a difference in the pre-tilt angles of the liquid crystals of the display liquid crystal cell 30 and the compensation liquid crystal cell 50. Thus, high contrast black and white color can be obtained.

Further, the manufacturing process therefor can be simplified because a control of the cell gap D is unnecessary, and reproducibility thereof becomes higher.

What is claimed is:

1. A double super twisted nematic (DSTN) liquid crystal display (LCD) comprising:

a liquid crystal display cell having first and second transparent substrates arranged parallel to each other, first and second orientation layers formed on opposing surfaces of the first and second transparent substrates, respectively, a first liquid crystal sealed between the first and second orientation layers, and indium tin oxide (ITO) electrodes formed on the opposing surfaces of the first and second transparent substrates while crossing each other; and a liquid crystal compensation cell having a third transparent substrate attached to the second transparent substrate, a fourth transparent substrate arranged in parallel to the third transparent substrate, third and fourth orientation layers formed on each opposing surface of the third and fourth transparent substrates, and a second liquid crystal sealed between the third and fourth orientation layers, wherein a pre-tilt angle of the first liquid crystal sealed between the first and second orientation layers is greater than a pre-tilt angle of the second liquid crystal sealed between the third and fourth orientation layers such that the difference between changes in the refractive index anisotropies of the first and second liquid crystals is compensated for.

2. The DSTN LCD of claim 1, wherein all of the orientation layers are processed by rubbing in which rubbing pressure and curing temperature are controlled such that pre-tilt angles of the orientation layers are different.

3. The DSTN LCD of claim 2, wherein the first and second orientation layers are rubbed according to the characteristics of the first liquid crystal, such that the rubbing direction of the first orientation layer is at a predetermined angle with respect to the rubbing direction of the second orientation layer.

4. The DSTN LCD of claim 3, wherein the third and fourth orientation layers are rubbed according to the characteristics of the second liquid crystal, such that the rubbing direction of the third orientation layer is at a predetermined angle to the rubbing direction of the fourth orientation layer.

5. The DSTN LCD of claim 4, wherein the rubbing direction of the second orientation layer is perpendicular to the rubbing direction of the third orientation layer.

6. A double super twisted nematic (DSTN) liquid crystal display (LCD) comprising:

a liquid crystal display cell having first and second transparent substrates arranged parallel to each other, first and second orientation layers formed on opposing surfaces of the first and second transparent substrates, respectively, a first liquid crystal sealed between the first and second orientation layers, and indium tin oxide (ITO) electrodes formed on the opposing surfaces of the first and second transparent substrates while crossing each other; and a liquid crystal compensation cell having a third transparent substrate attached to the second transparent substrate, a fourth transparent substrate arranged in parallel to the third transparent substrate, third and fourth orientation layers formed on each opposing surface of the third and fourth transparent substrates, and a second liquid crystal sealed between the third and fourth orientation layers wherein a pre-tilt angle of the first liquid crystal sealed between the first and second orientation layers differs from a pre-tilt angle of the second liquid crystal sealed between the third and fourth orientation layers such that the difference between changes in the refractive index anisotropies of the first and second liquid crystals is compensated for, wherein the pre-tilt angle of the second liquid crystal sealed between the third and fourth orientation layers is 3–4° smaller than the pre-tilt angle of the first liquid crystal sealed between the first and second orientation layers.

* * * * *